Oct. 21, 1930.  H. T. KRAFT  1,779,397
FUEL TANK
Filed Dec. 24, 1927

Inventor
Herman T. Kraft.

By

Attorney

Patented Oct. 21, 1930

1,779,397

UNITED STATES PATENT OFFICE

HERMAN T. KRAFT, OF AKRON, OHIO, ASSIGNOR TO GOODYEAR-ZEPPELIN CORPORATION, OF AKRON, OHIO, A CORPORATION OF DELAWARE

FUEL TANK

Application filed December 24, 1927. Serial No. 242,501.

My invention relates to fuel tanks and it has particular relation to a fuel tank adapted for use in aircraft.

One object of the invention is to provide a fuel tank which will not leak when an opening is formed in the tank as a result of penetration by a projectile or the like.

Another object of the invention is to provide a fuel tank which may be greatly distorted and yet normally retain its contents.

Heretofore, fuel tanks for airplanes of the so-called "leak proof" type have been constructed of an inner metallic container, one or more layers of rubber outside the container and a fabric covering for the container. In the event a tank of this type were pierced by a projectile, or the like, the gasoline attacked the rubber at the opening thus formed, which was closed by the swelling of the rubber. However, the opening in the metallic container permitted gasoline to seep or collect between the rubber and the container thereby affecting the efficiency of the fuel tank over a relatively large area.

Another disadvantage of prior tank constructions of the type referred to resided in the fact that oftentimes in an airplane crash, the tank was so distorted and suddenly subjected to such fluid pressure that it burst, resulting in burning and consequent destruction of the airplane. The danger to life and property of such crashes is well known.

A tank constructed according to this invention comprises essentially a layer of rubber and fabric, the rubber having a coating of gelatin solution or the like on its inner surface. The gelatin prevents the gasoline from attacking the rubber except at such times when the rubber is penetrated and then it limits the gasoline attack to the rubber exposed by the opening. A tank of this construction has such great flexibility that it can be deformed to meet the requirements of the fluid pressure of the gasoline and consequently prevents bursting of the tank in an airplane crash. If desirable, a metallic framework may be employed normally to maintain the shape of the tank, but which is sufficiently deformable to prevent bursting thereof.

Figure 1:
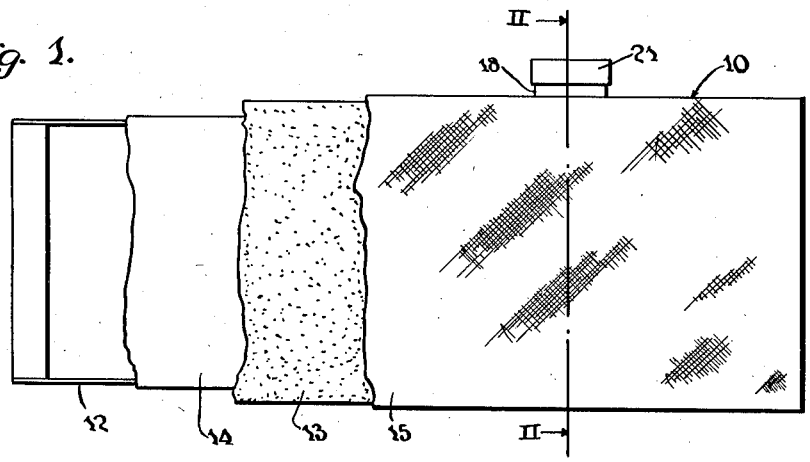
Figure 2:
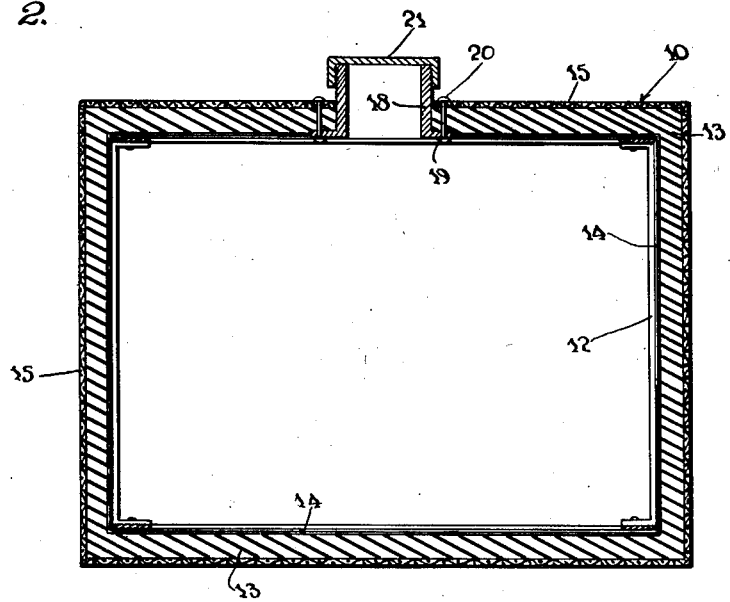

For a better understanding of the invention, reference may now be had to the accompanying drawings, forming a part of this specification, in which:

Fig. 1 is a fragmentary elevational view of a tank constructed according to the invention; and Fig. 2 is a cross-sectional view on a larger scale, taken substantially along the line 2—2 of Figure 1.

In practicing the invention I provide a tank 10 which may be of any shape desired but which, for the sake of convenience, is shown to be of rectangular shape. An open structural framework 12 normally defines the shape of the tank and is constructed preferably of metal bars, or constructed of intermeshing wires. On the exterior of the frame there is applied a layer of sponge rubber 13 preferably slightly undercured while the inner surface thereof is coated with a material, such as a gelatine solution 14, which is insoluble in hydro-carbons and normally prevents the gasoline in the tank from attacking the rubber. Slightly undercured rubber compound is preferred, since it is more readily attacked by gasoline and therefore expands quickly to close any opening in the rubber exposed to gasoline.

For the purposes of reinforcement, the rubber has on its outside a layer of fabric 15. The fabric normally maintains the shape of the rubber container and prevents lateral expansion thereof which tends to occur when the rubber exposed by an opening expands. The fabric, however, has sufficient tensile strength to allow relatively great distortion of the tank without bursting thereof.

In order that the tank may be filled with fuel, a tube or pipe 18 is provided having a flange 19 adjacent its lower edge. The tube and flange do not engage the framework 12 but are secured to the rubber and fabric by means of rivets 20. An ordinary cap 21 is threaded upon the outer extremity of the tube. It is apparent that many other tube constructions may be employed for admitting fuel into the tank, the one shown and described being merely illustrative.

Although the rubber portion of the tank described surrounds the framework, it is apparent that if desired, the framework may be disposed outside of the tank. It is also apparent that circumstances may warrant dispensing with the framework altogether; in which case the tank would be constructed of rubber and fabric and have relatively greater flexibility.

From the foregoing description, it is apparent that I have provided a tank which is substantially leak proof and which is capable of being materially distorted to prevent bursting thereof in the event the tank is crushed or otherwise injured. It is also apparent that the necessity of a metal container is obviated, although I prefer to employ a framework to assist in normally maintaining the shape of the tank.

Although I have illustrated only the preferred form which my invention may assume, and have described that form in detail, it will be apparent to those skilled in the art that it is not so limited, but that various modifications and changes may be made therein without departing from the spirit of the invention or from the scope of the appended claims.

What I claim is:

1. A fuel tank comprising an open framework and a layer of rubber compound disposed on the outer side of the framework, the inner surface of the rubber being coated with a material insoluble in hydrocarbons, the inner surface of the framework being directly exposed to the fuel in the tank.

2. A fuel tank comprising an open framework, a layer of rubber compound on the outer side of the framework, the inner surface of the rubber being coated with a material insoluble in hydrocarbons and a layer of fabric disposed over the outer side of the rubber.

3. A fuel tank comprising an open framework, a layer of sponge rubber on the outer side of the framework, the inner surface of the sponge rubber being coated with a material insoluble in hydrocarbons, and a layer of fabric disposed over the outer side of the sponge rubber.

4. A fuel tank comprising an open framework, a layer of rubber compound on the outer side of the framework, the inner surface of the rubber being coated with a gelatinous solution, and a layer of fabric over the outer side of the rubber.

5. A fuel tank comprising an open framework and a layer of elastic material disposed on the outer side of the framework, the inner surface of the material being coated with a material insoluble in hydrocarbons, and the inner surface of the framework being directly exposed to the fuel in the tank.

In witness whereof, I have hereunto signed my name.

Signed at Akron, in the county of Summit, and State of Ohio, this 23rd day of December, 1927.

HERMAN T. KRAFT.